US009669647B2

(12) United States Patent
Mayer et al.

(10) Patent No.: US 9,669,647 B2
(45) Date of Patent: Jun. 6, 2017

(54) SECURITY ELEMENT COMPRISING A PLURALITY OF OPTICALLY VARIABLE STRUCTURES

(71) Applicant: GIESECKE & DEVRIENT GMBH, Munich (DE)

(72) Inventors: Karlheinz Mayer, Grunenbach (DE); Thanh-Hao Huynh, Bruckmuhl (DE); Peter Franz, Pienzenau/Bruck (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 44 days.

(21) Appl. No.: 14/348,749

(22) PCT Filed: Sep. 20, 2012

(86) PCT No.: PCT/EP2012/003941
§ 371 (c)(1),
(2) Date: Mar. 31, 2014

(87) PCT Pub. No.: WO2013/045055
PCT Pub. Date: Apr. 4, 2013

(65) Prior Publication Data
US 2014/0232100 A1 Aug. 21, 2014

(30) Foreign Application Priority Data
Sep. 30, 2011 (DE) .................. 10 2011 114 647

(51) Int. Cl.
*B42D 25/425* (2014.01)
*B42D 25/324* (2014.01)
(Continued)

(52) U.S. Cl.
CPC .............. *B42D 25/425* (2014.10); *B41M 3/14* (2013.01); *B42D 25/29* (2014.10); *B42D 25/324* (2014.10);
(Continued)

(58) Field of Classification Search
CPC B42D 25/324; B42D 25/425; B42D 2033/24; B42D 2035/30
See application file for complete search history.

(56) References Cited

U.S. PATENT DOCUMENTS 5,797,632 A * 8/1998 Rice .................. B41M 3/06
283/114
6,036,233 A * 3/2000 Braun ................ B42D 25/328
283/72
(Continued)

FOREIGN PATENT DOCUMENTS

DE 102007035161 * 1/2009
DE 102007035161 A1 1/2009
(Continued)

OTHER PUBLICATIONS

WO2007093300 Translation (2007).*
(Continued)

*Primary Examiner* — Kyle Grabowski
(74) *Attorney, Agent, or Firm* — Workman Nydegger

(57) ABSTRACT

A security element includes an optically variable structure having a multiplicity of first embossed structures each including at least two flanks which converge at at least one certain angle. In at least one first partial region of the optically variable structure, at least one flank of the first embossed structures respectively has at least one additional embossed structure which is mounted on the flank of the first embossed structures or inserted into the flank of the first embossed structures. The geometry of the at least one additional embossed structure is executed to be at least near-inverse to the geometry of that flank of the first embossed structure on which the at least one additional embossed structure is mounted or inserted.

11 Claims, 6 Drawing Sheets

(51) Int. Cl.
*G02B 5/04* (2006.01)
*B41M 3/14* (2006.01)
*B42D 25/29* (2014.01)
*B42D 25/328* (2014.01)

(52) U.S. Cl.
CPC ............ *G02B 5/045* (2013.01); *B42D 25/328* (2014.10); *B42D 2033/24* (2013.01)

(56) References Cited

U.S. PATENT DOCUMENTS

| | | | |
|---|---|---|---|
| 6,176,521 B1 * | 1/2001 | Mancuso | B42D 15/00 283/90 |
| 6,712,397 B1 * | 3/2004 | Mayer | B42D 25/425 283/91 |
| 7,630,954 B2 * | 12/2009 | Adamczyk | B42D 25/29 283/72 |
| 8,100,436 B2 | 1/2012 | Heine et al. | |
| 8,137,899 B1 * | 3/2012 | Muller | B42D 25/425 283/72 |
| 8,498,033 B2 * | 7/2013 | Witzman | B42D 15/00 283/86 |
| 8,595,964 B2 | 12/2013 | Wang et al. | |
| 2007/0206298 A1 | 9/2007 | Lin | |
| 2007/0246932 A1 | 10/2007 | Heine et al. | |
| 2011/0000110 A1 | 1/2011 | Wang et al. | |
| 2014/0312608 A1 * | 10/2014 | De Blas | B42D 15/0013 283/85 |

FOREIGN PATENT DOCUMENTS

| | | | | |
|---|---|---|---|---|
| FR | WO 2010100360 A1 | * | 9/2010 | ........... B42D 25/324 |
| JP | 2007168341 | * | 7/2007 | |
| WO | 2006018232 A1 | | 2/2006 | |
| WO | WO2007093300 | * | 8/2007 | |
| WO | 2009013000 A2 | | 1/2009 | |
| WO | 2010075979 A1 | | 7/2010 | |
| WO | 2011005889 A2 | | 1/2011 | |
| WO | WO 2011005889 A2 | * | 1/2011 | ......... B42D 2033/24 |

OTHER PUBLICATIONS

DE102007035161 Translation (2009).*
JP2007168341 Translation (2007).*
Bronstein, "Handbook of Mathematics", Verlag Harri Deutsch, 1989, chapter 2.6.2 "solid geometry".
International Preliminary Report on Patentabilty for corresponding International PCT Application PCT/EP2012/003941, mailed Apr. 1, 2014.
International Search Report for corresponding International PCT Application PCT/EP2012/003941, mailed Feb. 15, 2013.
Wikipedia, "Prism (Geometry)," URL: http://en.wikipedia.org/w/index.php?title=Prism_(geometry), downloaded on May 23, 2014.
Wikipedia, "Pyramid (Geometry)," URL: http://en.wikipedia.org/w/index.php?title=Pyramid_(geometry), downloaded on May 23, 2014.

* cited by examiner

SECURITY ELEMENT COMPRISING A PLURALITY OF OPTICALLY VARIABLE STRUCTURES

BACKGROUND

This invention relates to a security element with an optically variable structure having a multiplicity of first embossed structures. Each of the first embossed structures consists of at least two flanks which converge at least one certain angle. In at least one partial region of the optically variable structure, at least one flank of the first embossed structures respectively has at least one additional embossed structure which is mounted on the flank of the first embossed structures or inserted into the flank of the first embossed structures. The invention relates further to a tool for manufacturing this security element.

SUMMARY

For thwarting attempts to forge value documents, such as for example bank notes, papers of value, identity cards, credit cards, debit cards or the like, new security elements are continually being sought. Advantageous elements are ones having a suitable tilt effect, since they are hard to copy but can be checked easily and without auxiliary means. For this purpose, use is preferably made of structures, such as dots or lines, which have a tilt effect through a skillful arrangement with a background print.

WO 2006/018232 A1 discloses a generic security element for value documents with an optically variable structure having an embossed structure and a coating. The embossed structure and the coating are so combined with each other that at least parts of the coating are completely visible upon perpendicular viewing, but hidden upon oblique viewing. The embossed structure consists of non-line-shaped embossed elements which are so combined with the coating that different information items become visible upon a change of viewing direction. At least a portion of the non-line-shaped embossed elements is disposed in a grid form and consists for example of embossed elements in the form of a tetrahedron, cylindrical segment or pyramid.

WO 2009/013000 A2 discloses a security element for value documents with an optically variable structure having a first embossed structure consisting of first embossed elements. This embossed structure is also so combined with a coating contrasting with the surface of the security element that at least partial regions of the coating are visible upon viewing in a first viewing-angle range, but at least partly hidden upon viewing in a second viewing-angle range. Upon tilting of the security element around a first axis, a first tilt effect thus arises. The optically variable structure has a second embossed structure which is disposed within the first embossed structure and produces a second tilt effect in addition to the first tilt effect. The second embossed structure is either incorporated into the first embossed elements through a partial change of the geometry of the first embossed elements, or consists of second embossed elements which are respectively attached to a flank of the first embossed elements at a certain angle.

It is disadvantageous in the stated prior-art prints in particular that the embossed structures require a multicolor structured background print which accordingly supports the feature and makes it susceptible to color alterations through strong register variations. Furthermore, at most two information contents are enabled in combination with corresponding color impressions. The colors employed here should be as bold as possible, but such colors often appear unreal in practice since they do not fit into the overall design of a bank note as one of the background colors, in particular in the case of a very light and colorful rendition.

The invention is therefore based on the object of developing a generic security element and a tool for manufacturing a generic security element such that the disadvantages of the prior art are remedied and the protection from forgeries is further increased.

This object is achieved by the features of the independent claims. Developments of the invention are the subject matter of the dependent claims.

According to the invention, the geometry of the at least one additional embossed structure is executed so as to be at least near-inverse to the geometry of that flank of the first embossed structure on which the at least one additional embossed structure is mounted or inserted.

"Inverse" means according to this invention that the geometry of the additional embossed structure corresponds to the mirrored geometry of the flank of the first embossed structure, the mirror plane being aligned perpendicular to the surface of the security element, in the center of the flank and parallel to the baseline of the flank of the first embossed structure. This mirroring corresponds to a rotation of the first embossed structure by 180° around an axis which is perpendicular to the surface of the security element. In the case of equilateral, symmetric first embossed structures, for example an equilateral pyramid or equilateral prism with a triangular end face in each case, the geometry of the additional embossed structure corresponds to the geometry of the flank opposite the flank to which the additional embossed structure is applied.

"Near-inverse" means according to this invention that the perpendicular flank of the additional embossed structure resulting upon the mirroring may in reality, for technical reasons, not be aligned completely perpendicular to the surface of the security element. Rather, this flank has an angle of 60° to 90° to the surface of the security element. This is due to the fact that the depressions in an embossing plate which produce the embossed structures of the security element cannot be produced with a perpendicular flank either by a laser or by mechanical milling or ablating apparatuses.

A tool for manufacturing such security elements or embossed elements is for example a printing plate, in particular an intaglio printing plate, or an embossing plate, in particular a blind-embossing intaglio printing plate. A blind-embossing intaglio printing plate here is an intaglio printing plate whose depressions are not filled with ink, so that the substrate is only embossed but not subjected to ink on its surface.

According to a preferred embodiment, the at least one first partial region has an outline form which contains a first information item, the first information item being optically recognizable to a viewer only in a first viewing-angle range. Upon perpendicular viewing of the security element, the first information item is not recognizable to a viewer. The additional embossed structure with embossed flanks inverse to the first embossed structure thus has a further additional information item which reveals different information items from different viewing angles, but remains largely concealed upon direct plan viewing.

According to a further preferred embodiment, in at least one second partial region of the optically variable structure at least one other flank of the first embossed structures respectively has at least one second additional embossed structure which is mounted on the other flank of the first embossed structures or inserted into the other flank of the first embossed structures. The geometry of the at least one second additional embossed structure is executed to be at least near-inverse to the geometry of the other flank of the first embossed structure on which the at least one second additional embossed structure is mounted or inserted. This at least one second partial region also preferably has an outline form which contains a second information item, the second information item being optically recognizable to a viewer only in a second viewing-angle range. There thus result at least two information items which are recognizable in different viewing-angle ranges.

According to a preferred embodiment, the surface of the optically variable structure of the security element has a homogeneous color tone at least in the region where the first embossed structures are disposed. Preferably, this color tone corresponds to the color tone of the substrate of the security element into which the first embossed structures are embossed. When the optically variable structure is embossed directly into a substrate made of paper, for example a bank note, and the substrate has no additional imprint in this region, the color tone corresponds to the color tone of the paper. In the current euro bank notes of the first series, the paper of each denomination is colored differently, for example purple in the 50 euro bank note and green in the 100 euro bank note.

Particularly preferably, however, there is applied to the substrate of the security element before or after the incorporation of the embossed elements according to the invention an imprint or coating with a homogeneous color tone, said imprint or coating having an especially high contrast between direct illumination and indirect or shadowed illumination. It has turned out that a metallic or metallically lustrous color tone has an especially high contrast and thus causes an especially pronounced tilt effect, because the impinging light is then reflected specularly for the most part and diffusely only to a small extent. The imprint or coating is applied to the substrate for example by screen printing, as a silver-colored patch or as a silver-colored foil.

The surface of the security element is provided particularly preferably with a reflective or metallic or metallically reflective coating, so that the surface reflects the impinging light near-specularly. This coating which is applied to the substrate is preferably executed as follows:
- as a metallic or metallic-seeming screen printing ink,
- as an ink with optically variable pigments, preferably so-called OVI pigments,
- as an ink with optically variable pigments which are additionally alignable magnetically, preferably so-called OVMI pigments,
- as an ink with optically variable Iriodin pigments e.g. from the company Bayer, which has been applied by flexographic printing or screen printing and is preferably combined with a background applied by offset printing,
- as a foil in the form of a strip or patch which has been applied to the substrate,
- as a lustrous offset ink which preferably has a metallically lustrous surface,
- as a lustrous intaglio printing ink which preferably has a black color tone or is colorless or can also have a metallically lustrous appearance, such as for example gold or silver.

A prism according to this invention has a square or rectangular base, with square or rectangular faces respectively converging at a certain angle from two opposing sides of the base and forming an edge where they meet (see also Bronstein, Semendjajew "Taschenbuch der Mathematik", Verlag Harri Deutsch, 1989, chapter 2.6.2 "Stereometrie"). The two end faces of the prism are triangular. A prism thus consists of a square or rectangular base, two square or rectangular lateral faces and two triangular end faces. Alternatively, the lateral faces can also be of trapezoidal configuration, so that the prism has the form of a hipped roof or a wedge.

A pyramid according to this invention has, like the prism, a square or rectangular base. In contrast to the prism, however, triangular faces converge from all four sides of the base and form a vertex where they meet (see also Bronstein, Semendjajew "Taschenbuch der Mathematik", Verlag Harri Deutsch, 1989, chapter 2.6.2 "Stereometrie"). A pyramid thus consists of a square or rectangular base and four triangular lateral faces. Instead of a square or rectangular base, any other n-sided base is of course also possible, in which case the so-called n-sided pyramid results. For example, a triangular base results in a tetrahedron.

The special advantage of the security element according to the invention is that it cannot be imitated by relatively simple techniques. In particular, it requires for its manufacture the use of a laser which, firstly, can produce sufficiently exact depressions in embossing plates and, secondly, has the necessary pulse quality to produce an embossing die of this quality.

Likewise, the security element according to the invention requires for its manufacture a very high mechanical pressure on the substrate to be embossed, without injuring it by initial cuts or through-cuts in the paper. Preferably, the embossed structures are produced by means of the intaglio printing process which is known from bank-note printing and cannot be imitated by forgers except with considerable financial and technical effort.

Particularly preferably, the embossed structures merge into each other gently on the flanks, i.e. flank angles of more than 70° should be avoided if possible, in order to avoid injuries to the substrate such as the above-mentioned initial cuts or through-cuts in the paper if the substrate is made of paper. In particular, the steepness of the embossed structures or their flanks influences the tear behavior of the substrate. Particularly preferably, in the case of linear such as for example prism-shaped embossed structures, the embossed structures are disposed so as to be slightly rotated relative to the axis of the embossing cylinder, preferably by about 5°, in order that they do not extend parallel to the axis of the embossing cylinder.

Further advantages of the security element according to the invention are that the security element is recognizable to the user or the man on the street without auxiliary means, has an embossed structure with long-term stability, and can be employed as a means of design.

The engraving depth of the structures in an embossing plate for manufacturing the embossed structures according to the invention amounts to 20 µm to 500 µm, preferably 30 µm to 150 µm, and particularly preferably 50 µm to 130 µm. The height of the raised embossed structures that can be manufactured with such an embossing plate is dependent on the substrate into which the embossed structures are embossed. In the case of a cotton substrate, the height of the embossed structures can amount for example to about 90% of the engraving depth, and in the case of a plastic substrate for example only 30%. In the case of pyramid-like embossed structures, the length of a pyramid edge amounts to 20 µm to 4000 µm, preferably 100 µm to 1000 µm, and particularly preferably 120 µm to 600 µm. The distance between individual embossed structures amounts to 0 μm to 600 μm, preferably 0 μm to 300 μm, and particularly preferably 2 μm to 100 μm.

Instead of raised embossed elements, recessed embossed elements are of course also possible. In this case, the embossed elements do not protrude out of the plane of the substrate surface, but form depressions in the substrate surface, the embossed elements thus protruding into the substrate. However, a corresponding embossing plate in this case cannot have elevations relative to the embossing-plate level, because they would impair the wiping operation for example by means of a doctor knife. Instead, the elevations must in this case be formed in a recessed or depressed region of the embossing plate, such that the elevations do not protrude beyond the embossing-plate level. These structures thus correspond to structures as are known for example from WO 2010/075979 A1. Thus, FIG. 2 of WO 2010/075979 A1 shows an accordingly embossed substrate, and FIG. 3 an embossing plate for producing embossed structures of FIG. 2.

Preferably, the information item produced by the embossed structures consists of a combination of an alphanumeric datum, for example a denomination number "50", with a further graphical datum, for example a "€" symbol. In a first angle range in which a viewer looks onto the security element, the viewer then sees the alphanumeric datum, and in a second angle range the graphical datum. Upon perpendicular viewing of the security element, both the alphanumeric datum and the graphical datum disappear, so that the viewer sees only the embossed substrate without further information or a near-homogeneous color. The outside contour of the embossing and the outside contour of the screen printed metal surface can also form an information item. Moreover, a fine line can also be provided at the place where the surface of the plate remains untouched or unembossed, said line representing a third information item.

The depressions in an embossing plate for producing the embossed structures are preferably removed from the embossing plate with a laser, in order to obtain a higher aspect ratio of depth t to width b of the steep flanks t/b of 1.5 to approx. 12, i.e. a flank angle of 48° to 85°, a greater geometric diversity and sharper and detailed and clearly delimiting information contents. This causes the embossing to be executed so as to be mechanically more stable, and the information contents to be rendered clearly separate from each other on the sides.

Particularly preferably, the embossed structures according to the invention are combined with a metallic-seeming base, which is applied to the substrate for example by screen printing, as a silver-colored patch or as a silver-colored foil.

Particularly preferably, the embossing and the printing of the substrate are carried out in one working operation, by employing for example ink-carrying intaglio printing. In this case, the depressions of an intaglio printing plate are filled at least partly with one or more different inks, so that upon printing of the print substrate the print substrate is not only deformed or embossed, but also subjected to ink.

The substrate preferably comprises paper and/or a foil, in particular a translucent foil. In the simplest case, the substrate consists completely either of paper or of plastic. However, the substrate can also consist of different materials in certain regions, consisting in particular of paper in one region and at the same time of plastic, preferably a translucent foil, in another region. This makes it possible to emboss different materials as a substrate in one working operation. A translucent foil is understood in this connection to be either a transparent or a semi-transparent foil, for example a glazing foil, which contains for example polyamide, polyester, polyethylene or biaxially oriented polypropylene (BOPP).

According to a preferred embodiment, the embossed elements are incorporated into a translucent foil. This translucent foil can for example at least partly cover an opening in an opaque value document.

According to a preferred embodiment, at least a portion of the non-line-shaped embossed elements is configured to be tactilely detectable, so that the viewer can not only recognize them optically, but also feel them for example with his fingertips.

Value documents according to the present invention are in particular bank notes, shares, bonds, deeds, vouchers, checks, high-value admission tickets, but also other papers at risk of forgery, such as passports or other identity documents, and also card-shaped data carriers, in particular chip cards, as well as product authentication elements, such as labels, seals, packages and the like. The term "value document" also includes precursors of such data carriers, which are unfit for circulation and are present for example in quasi-endless form, in the case of security paper, and processed further at a later time.

With reference to the following examples and supplementary figures, the advantages of the invention will be explained. The described single features and hereinafter described exemplary embodiments are inventive taken alone, but also inventive in combination. The examples represent preferred embodiments, but the invention should in no way be limited thereto. The proportions shown in the figures do not correspond to the relations existing in reality and serve solely to improve the clearness.

BRIEF DESCRIPTION OF THE DRAWINGS

Specifically, the schematic drawings show the following.

DETAILED DESCRIPTION OF VARIOUS EMBODIMENTS

Figure 1A:
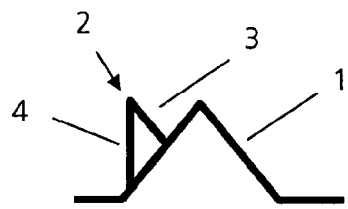
FIG. 1 a pyramid- or prism-shaped embossed structure according to the invention in cross section, or its end face, with one (FIG. 1a) or two (FIG. 1b) additional embossed flanks, FIG. 2 an arrangement of different embossed structures according to the invention in a security element, FIG. 3 two different possibilities for incorporating an additional embossed structure from FIG. 1 or FIG. 2 into the flank of a prism-shaped embossed structure, FIG. 4 an advantageous embodiment of the embossed structure from FIG. 3b, FIG. 5 an embossing plate with depressions for producing prism-shaped embossed structures, FIG. 6 an exemplary embodiment of an embossed structure according to the invention in the form of a pyramid in plan view, FIG. 7 the exemplary embodiment from FIG. 6 in an oblique top view, FIG. 8 a security element with a grid-shaped arrangement of a multiplicity of embossed structures according to the invention in the form of a pyramid in plan view, FIG. 9 a further security element with a grid-shaped arrangement of a multiplicity of embossed structures according to the invention in the form of a pyramid in plan view, FIG. 10 a frustum-shaped embossed structure according to the invention having an additional information item on the top face in the form of a depression that is wave-shaped on one side (left picture) or a depression in the form of text (right picture), FIG. 11 a frustum-shaped embossed structure according to the invention having an additional embossed structure that is wave-shaped on both sides (left picture) or an additional embossed structure that is wave-shaped on one side (right picture).
Figure 1B:
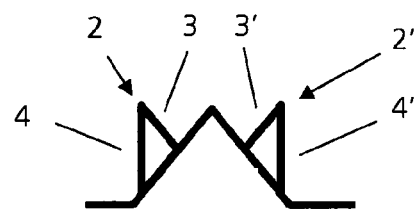

FIG. 1 shows a substrate in cross section, or its end face, into which substrate a pyramid- or prism-shaped embossed structure 1 has been embossed, the embossed structure 1 having respectively different information items. In FIG. 1a, the information item is formed on the left flank of the embossed structure 1 by an additional embossed structure 2 consisting of a left flank 4 which is aligned near-perpendicular to the plane of the substrate, and a right flank 3 which is aligned parallel or near-parallel to the right flank of the embossed structure 1. "Parallel" or "near-parallel" means in this connection that the angle between the right flank 3 and the substrate is equal or near-equal to the angle between the right flank of the embossed structure 1 and the substrate. Thus, the additional embossed structure 2 is executed so as to be inverse or near-inverse to the left flank of the embossed structure 1. In FIG. 1b two information items are formed by two additional embossed structures 2 and 2' on the left and right flanks of the embossed structure 1. The additional embossed structure 2' consists of a right flank 4' which is aligned near-perpendicular to the plane of the substrate, and a left flank 3' which is aligned parallel or near-parallel to the left flank of the embossed structure 1. Thus, the additional embossed structure 2' is executed so as to be inverse or near-inverse to the right flank of the embossed structure 1. When the light impinging on the differently inclined flanks is reflected in different angle ranges, this results in a tilt effect.

Additionally, a tilt effect results from shadowing the left flank of the embossed structure 1 in FIG. 1a or both flanks in FIG. 1b.

When a viewer looks onto the embossed structure 1 or onto the right flank of the embossed structure 1 from above in FIG. 1a, he sees the embossed structure 1 without shadowing through the additional embossed structure 2, whereas when looking onto the left flank he sees it with a shadowing through the additional embossed structure 2 so that it appears darker for example.

When a viewer looks onto the embossed structure 1 from above in FIG. 1b, he sees the embossed structure 1 without shadowing through the additional embossed flanks 2 and 2', whereas when looking onto the left or right flank he sees it with a shadowing through the additional embossed structure 2 or 2' so that it appears darker for example. A different information items is represented by the additional embossed structure 2 than by the additional embossed structure 2' when the totality of all additional embossed flanks 2 has a different outline form than the totality of all additional embossed flanks 2'. When the totality of both additional embossed flanks 2 and 2' has the same outline form, both additional embossed flanks 2 and 2' represent the same information item.

FIG. 2 shows by way of example an arrangement of different embossed structures in a rectangular security element, the respective prism-shaped embossed structures containing different information items. The total security element has a homogeneous color, by the embossed substrate either being unprinted and the security element thus having the color of the substrate, or by the substrate being printed with a homogeneous color, for example with a metallically lustrous color. In FIG. 2a, which shows the security element in plan view, the different information items are represented for better illustration in different colors (white, gray, black). In the upper region of FIG. 2a there are represented two horizontal black bars which show by way of example the alignment of the prism-shaped embossed structures. The flanks or the ridge of the prism-shaped embossed structures thus extend from the left to the right in this exemplary embodiment.

Figure 2A:
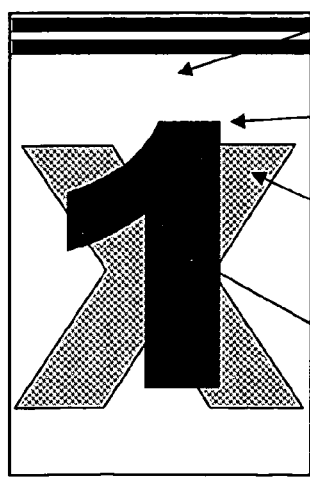
Figure 2A:
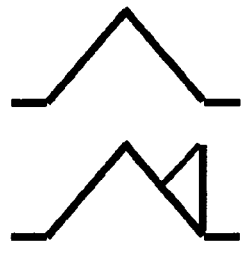

FIGS. 2b to FIG. 2e show the cross section or end face of the respective embossed structure from FIG. 2a.

FIG. 2b shows the field represented in white in FIG. 2a, which contains no additional information item, i.e. the field appears in a homogeneous color from almost all viewing angles. This field is formed by a prism-shaped structure which has no additional embossed structure.

Figure 2C:
Figure 2C:

FIG. 2c shows the field represented in black in FIG. 2a, whose outline shows a first additional information item in the form of the digit "1" which is recognizable only in a first viewing-angle range. The digit "1" is formed by an additional embossed structure which is located on the right flank of the prism-shaped structure. The additional embossed structure leads to a changed reflection behavior of the at least partly mirroring surface of the total embossed structure. Furthermore, the additional embossed structure casts a shadow on the right flank of the prism-shaped structure, which thus appears darker within the first viewing-angle range than the surrounding regions. Viewing the embossed structure in a direction from above, i.e. in an angle range around the perpendicular to the security element, the first additional information item, i.e. the digit "1", disappears.

FIG. 2d shows a gray field whose outline shows a second additional information item in the form of the letter "X" which is recognizable only in a second viewing-angle range which is different from the first viewing-angle range or overlaps it only partly. The letter "X" is formed by an additional embossed structure according to FIG. 1a, which is located on the left flank of the prism-shaped structure. This additional embossed structure also leads to a changed reflection behavior of the at least partly mirroring surface of the total embossed structure. Furthermore, the additional embossed structure casts a shadow on the left flank of the prism-shaped structure, which thus appears darker within the second viewing-angle range than the surrounding regions. Viewing the embossed structure in a direction from above, i.e. in an angle range around the perpendicular to the security element, the second additional information item, i.e. the letter "X", disappears.

FIG. 2e shows the region in which the first and the second additional information items overlap or superimpose each other. In this region the digit "1" is to be recognized in the first viewing-angle range, and the letter "X" in the second viewing-angle range, the embossed structure being shaped according to the embossed structure from FIG. 1b. Viewing the embossed structure in a direction from above, i.e. in an angle range around the perpendicular to the security element, both the first additional information item, i.e. the digit "1", and the second additional information item, i.e. the letter "X", disappear.

Upon tilting of the security element along a tilting or rotation axis that is aligned parallel to the flanks or the ridge of the prism-shaped embossed structures or also parallel to the lower or upper edge of the security element, a viewer thus sees the following:

1. upon viewing perpendicular to the security element, an area in a homogeneous color tone, for example a homogeneous silvery lustrous area, i.e. only a near-uniform area without additional information items, 2. within the first viewing-angle range the digit "1" in a color tone darker than in point 1, i.e. for example in a dark silvery lustrous or matt silvery color, which is surrounded by an area in a homogeneous color tone, i.e. for example in a homogeneous silvery lustrous color,
3. within the second viewing-angle range the letter "X" in a color tone darker than in point 1, for example in a dark silvery lustrous or matt silvery color, which is surrounded by an area in a homogeneous color tone, for example in a homogeneous silvery lustrous color,
4. whereby the digit "1" and the letter "X" overlap in a partial region, so that in this partial region upon perpendicular viewing an area in a homogeneous color tone is to be seen, within the first viewing-angle range the digit "1" in a color tone darker than in point 1, and within the second viewing-angle range the letter "X" in a color tone darker than in point 1.

Figure 3A:
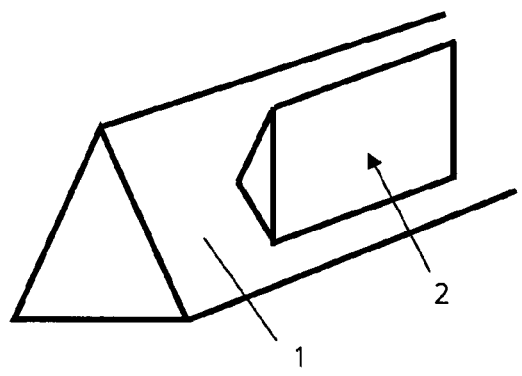
Figure 3B:
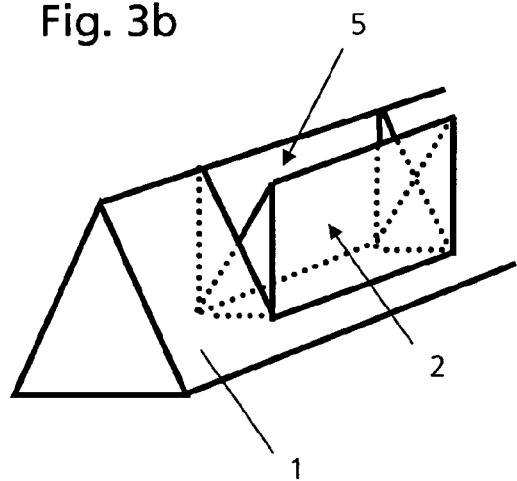

FIG. 3 shows two different variants in an oblique view of how an additional embossed structure 2 according to FIG. 1 or FIG. 2 can be applied to or incorporated into the flank of the prism-shaped embossed structure 1. According to FIG. 3a, the additional embossed structure 2 is mounted on the flank of the prism-shaped embossed structure 1. Alternatively, according to FIG. 3b, the flank has a recess 5 into which the additional embossed structure 2 is incorporated.

Figure 4:
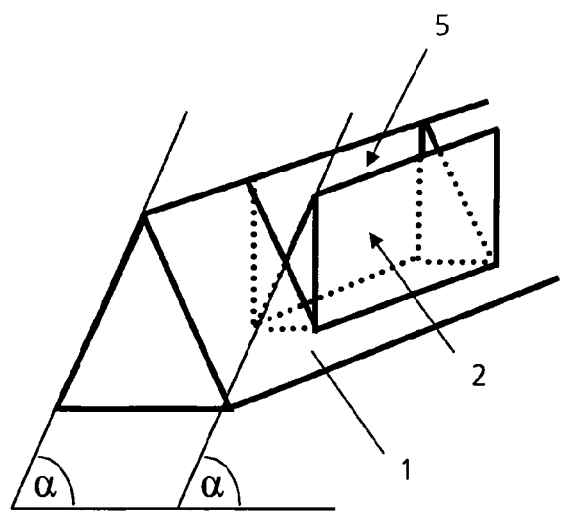

It is especially advantageous when, according to FIG. 4, the angle α of the left flank of the prism-shaped embossed structure 1 and the angle α of the left flank of the additional embossed flank 2 are equal, i.e. the two flanks are aligned parallel to each other.

Figure 5:
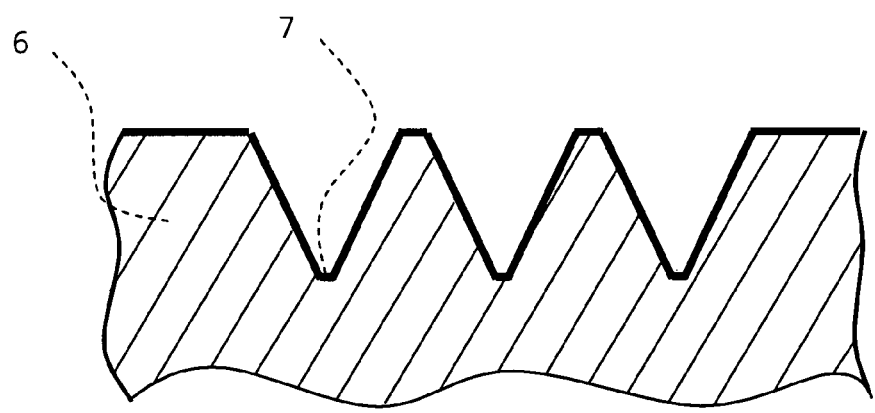

FIG. 5 shows a cross section through an embossing plate 6 with depressions 7 for producing prism- or pyramid-shaped embossed structures. A substrate is placed on the surface of the embossing plate 6, pressed into the depressions 7 at high mechanical pressure, and deformed. Advantageously, the basic embossing line has a straight upper edge which stably withstands the lasering and always remains constant "without injury".

Furthermore, more than two different information items can be produced and combined with each other, by for example the line- or prism-shaped embossed structure from FIG. 3 and FIG. 4 being replaced by a pyramid-shaped embossed structure with a rectangular or square base. This has the special advantage that a pyramid can represent different information items on four sides, compared to only two different information items on a prism.

Figure 6:
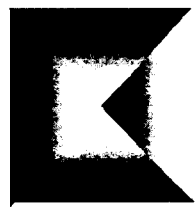
Figure 7:
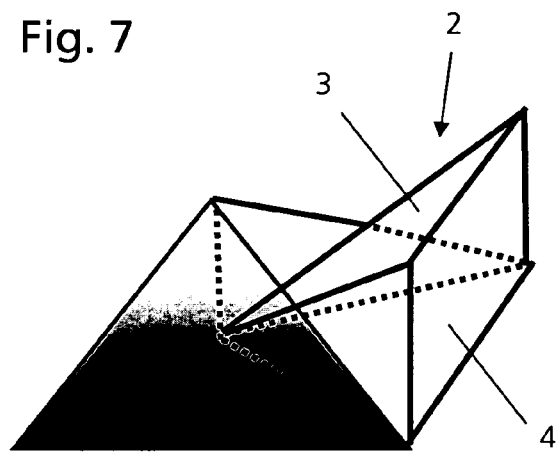

FIG. 6 shows an exemplary embodiment of an embossed structure according to the invention in the form of a pyramid with a square base in plan view, with an additional embossed structure incorporated into the right flank of the pyramid. FIG. 7 shows the exemplary embodiment from FIG. 6 in an oblique view. The right flank of the pyramid is completely left out and, in inverted form, "filled up" again by the additional embossed structure 2: at the place where the pyramid reaches its maximum height the additional embossed structure 2 has the height zero, with a rising flank which reaches its maximum height at the place where the pyramid would have the height zero.

Figure 8:
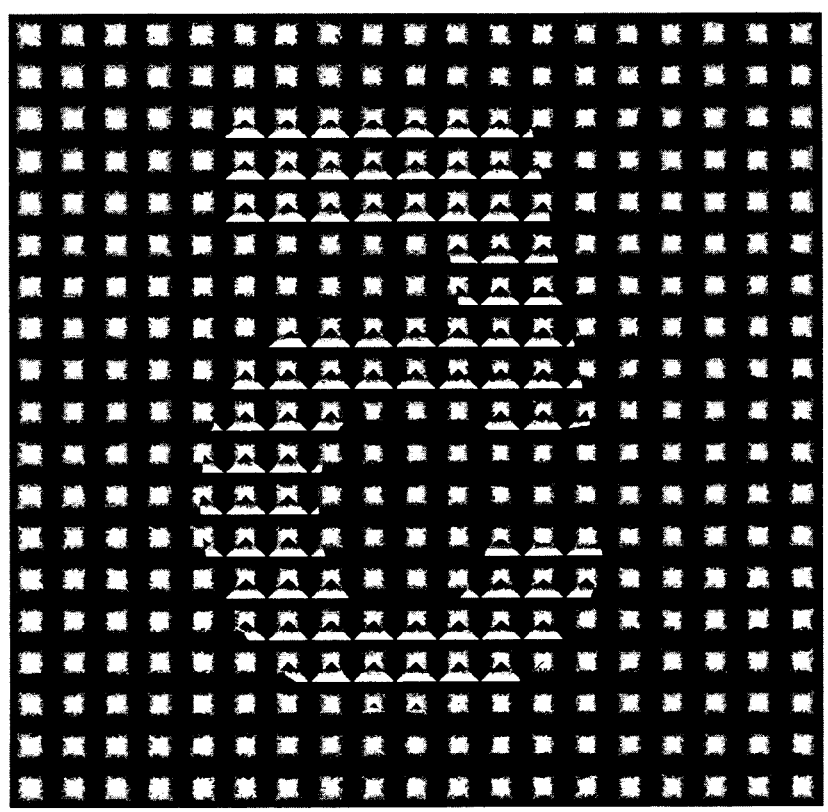

FIG. 8 shows a security element with a grid-shaped arrangement of a multiplicity of pyramid-shaped embossed structures without an additional embossed structure and of pyramid-shaped embossed structures with an additional embossed structure according to FIG. 6 or FIG. 7 in plan view. The embossed structures with an additional embossed structure are so disposed here that an additional information item in the form of a digit "5" is formed in a first angle range, said embossed structures being surrounded by the pyramid-shaped embossed structures without an additional embossed structure.

Figure 9:
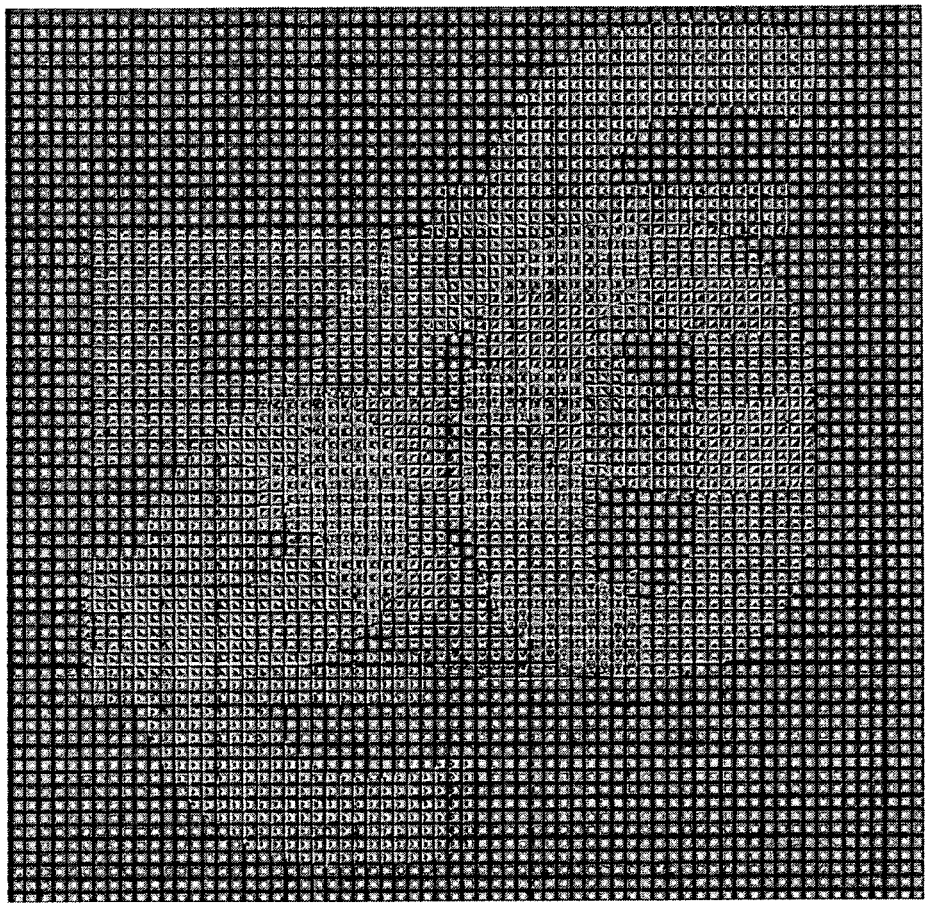

FIG. 9 shows a security element with a grid-shaped arrangement of a multiplicity of embossed structures according to the invention in the form of a pyramid in plan view, which form an additional information item in the form of the number "50" in a first viewing-angle range, and a geometrical figure in the form of the "€" symbol in a second viewing-angle range. The number "50" is formed for example by embossed structures according to FIG. 7, and the "€" symbol by embossed structures which likewise correspond to those from FIG. 7 but are rotated by 180° around the vertical axis of the pyramid, or mirrored, so that they have the additional embossed structure on their left flank. In the partial region where the number "50" and the "€" symbol overlap, the embossed structures respectively have an additional embossed structure on their left flank and on their right flank. Additionally, two further "€" symbols are incorporated at another position through embossed structures which likewise correspond to those from FIG. 7 but are rotated by 90° or 270° around the vertical axis of the pyramid. These information items become visible when the security element is rotated by 90° or 270° and then tilted. In this example, four different information items are thus visible from different rotation and viewing angles.

Figure 10:
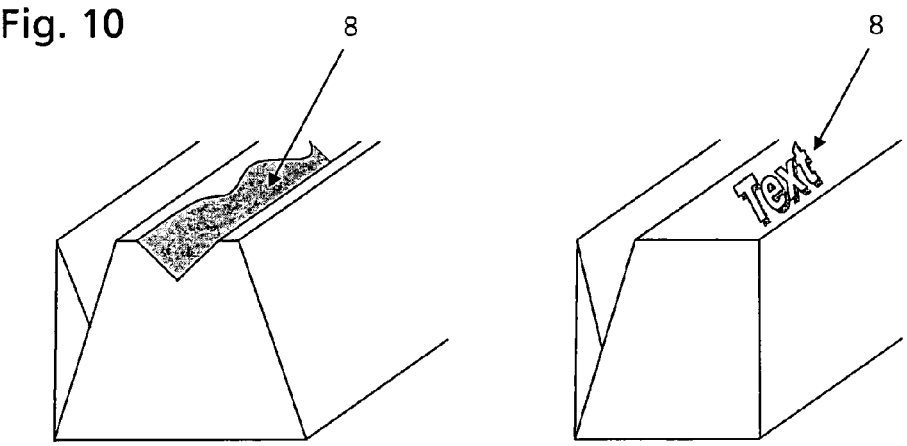

FIG. 10 shows a frustum-shaped embossed structure according to the invention with an additional information item on the top face. This additional information item can be executed for example in the form of a depression that is wave-shaped on one side, as represented on the left in FIG. 10. In this case the left edge of the depression is configured to be wave-shaped, and the right edge straight. Alternatively or additionally, the additional information item can be executed as a depression or an imprint in the form of text, as represented on the right in FIG. 10.

This has the advantage that a further information item becomes recognizable in particular upon plan viewing of the embossed structure.

Figure 11:
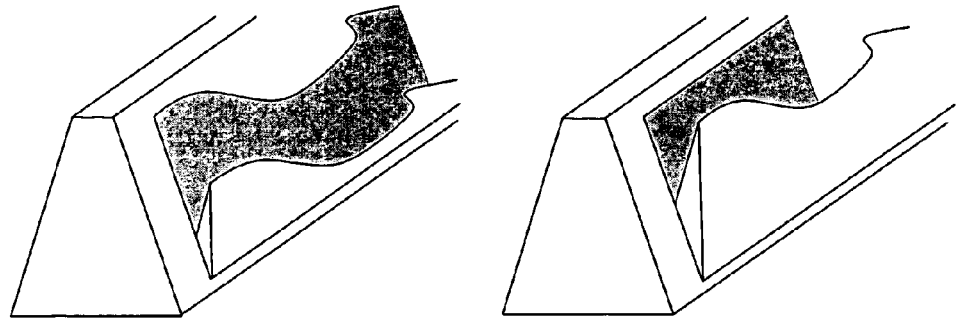

FIG. 11 shows a frustum-shaped embossed structure according to the invention with an additional embossed structure that is wave-shaped on both sides (left picture) or an additional embossed structure that is wave-shaped on one side (right picture). The wave shape of the embossed structures results from a different height profile of the respective embossed flank. This leads to a variation of the height of the flank of the additional embossed structure that is colored gray in FIG. 11.

The invention claimed is:

1. A security element with an optically variable structure having a multiplicity of first embossed structures, each of the first embossed structures comprising a prism including at least two flanks which converge at least one certain angle, and in at least one first partial region of the optically variable structure, at least one flank of the first embossed structures respectively has at least one additional embossed portion which extends from the flank of the first embossed structures or extends from a depression in the flank of the first embossed structures, wherein the geometry of the at least one additional embossed portion is executed so as to correspond to the shape of a half of the prism defined by the flank opposite the flank to which the additional embossed structure is applied, the geometry of the at least one additional embossed portion being further executed to be at least near-inverse to the geometry of that flank of the first embossed structure from which the at least one additional embossed portion extends.

2. The security element according to claim 1, wherein the at least one first partial region has an outline form which contains a first information item, the first information item being optically recognizable to a viewer only in a first viewing-angle range.

3. The security element according to claim 1, wherein in at least one second partial region of the optically variable structure, at least one other flank of the first embossed structures respectively has at least one second additional embossed portion which extends from the other flank of the first embossed structures or extends from a depression in the other flank of the first embossed structures, and the geometry of the at least one second additional embossed portion is executed so as to be at least near-inverse to the geometry of the other flank of the first embossed structure from which the at least one second additional embossed portion extends.

4. The security element according to claim 3, wherein the at least one second partial region has an outline form which contains a second information item, the second information item being optically recognizable to a viewer only in a second viewing-angle range.

5. The security element according to claim 1, wherein the embossed structures have a pyramid-shaped or prism-shaped geometry, and the flanks are the lateral and/or end faces of the embossed structures.

6. The security element according to claim 1, wherein the surface of the optically variable structure has a homogeneous color tone at least in the region where the first embossed structures are disposed.

7. The security element according to claim 6, wherein the security element consists of a substrate into which the first embossed structures are embossed and which has a homogeneous color tone, the color tone of the surface of the optically variable structure corresponding to the color tone of the substrate of the security element.

8. The security element according to claim 6, wherein the surface of the optically variable structure has applied thereto an imprint or a coating with a homogeneous color tone.

9. The security element according to claim 8, wherein a reflective or metallic or metallically reflective coating which is applied on the surface of the embossed elements produces the homogeneous color tone.

10. The security element according to claim 1, wherein the near-inverse geometry of the additional embossed portion corresponds to a mirrored geometry of the at least one flank of the first embossed structure, a mirror plane being aligned perpendicular to a surface of the security element, in the center of the at least one flank of the first embossed structure and parallel to the baseline of the flank of the first embossed structure,
the additional embossed portion having a first and second flank, the first flank extending from the at least one flank at an angle near-perpendicular to the at least one flank and near parallel to the opposite flank, and the second flank extending from the first embossed structure at an angle near-perpendicular to a lower surface of the security element.

11. A security element with an optically variable structure having a multiplicity of first embossed structures, each of the first embossed structures comprising a prism including at least a first and second flank, which converge at least one certain angle, and in at least one first partial region of the optically variable structure, the first flank of the first embossed structures has at least one additional embossed portion including a third and fourth flank, which converge at a certain angle, the third flank being near perpendicular to the first flank and near parallel to the second flank, and the fourth flank being aligned near-perpendicular to the surface of the security element and near-parallel to a baseline of the first flank of the first embossed structures.

\* \* \* \* \*